(12) United States Patent
Tanabe et al.

(10) Patent No.: US 12,044,898 B2
(45) Date of Patent: Jul. 23, 2024

(54) DEVICE AND METHOD FOR MANUFACTURING OPTICAL FIBER RIBBON

(71) Applicant: SWCC SHOWA CABLE SYSTEMS CO., LTD., Kawasaki (JP)

(72) Inventors: Kengo Tanabe, Kawasaki (JP); Hitoshi Saito, Kawasaki (JP); Takeshiro Nagai, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 0 days.

(21) Appl. No.: 18/071,075

(22) Filed: Nov. 29, 2022

(65) Prior Publication Data

US 2023/0108338 A1 Apr. 6, 2023

Related U.S. Application Data

(63) Continuation of application No. PCT/JP2021/020225, filed on May 27, 2021.

(30) Foreign Application Priority Data

May 29, 2020 (JP) .................................. 2020-094881

(51) Int. Cl.
*G02B 6/44* (2006.01)
(52) U.S. Cl.
CPC .................................. *G02B 6/448* (2013.01)
(58) Field of Classification Search
None
See application file for complete search history.

(56) References Cited

U.S. PATENT DOCUMENTS

| | | | | |
|---|---|---|---|---|
| 4,211,591 A | * | 7/1980 | Stiles | ................... G02B 6/4486 |
| | | | | 427/163.2 |
| 2017/0285287 A1 | | 10/2017 | Murata et al. | |
| 2018/0149821 A1 | | 5/2018 | Bringuier et al. | |

FOREIGN PATENT DOCUMENTS

| | | | | |
|---|---|---|---|---|
| CA | 2162194 A | * | 5/1996 | ............. G02B 6/245 |
| JP | 09325251 A | * | 12/1997 | ........... G02B 6/4403 |
| JP | 2009-301809 A | | 12/2009 | |
| JP | 2010-033010 A | | 2/2010 | |
| JP | 2012-252197 A | | 12/2012 | |

(Continued)

OTHER PUBLICATIONS

JP-09325251-A Clarivate Analytics Machine Translation retrieved Jul. 28, 2023. (Year: 2023).*

(Continued)

*Primary Examiner* — Lisa L Herring
(74) *Attorney, Agent, or Firm* — Harness, Dickey & Pierce, P.L.C.

(57) ABSTRACT

An optical fiber ribbon manufacturing device comprising: a tape die 20 for coating a plurality of single-core coated optical fibers 2 with a photocurable resin; a split die 30 for forming a split portion in the photocurable resin present between the single-core coated optical fibers; and a light irradiation device 40 for irradiating the photocurable resin with light to cure the photocurable resin, wherein both the tape die 20 and the split die 30 are temperature-controlled or only the split die 30 is temperature-controlled, a temperature of the tape die 20 is higher than a temperature of the split die 20, and the temperature of the split die 20 is lower than the temperature of the tape die 30.

3 Claims, 6 Drawing Sheets

(56) References Cited

FOREIGN PATENT DOCUMENTS

| | | | |
|---|---|---|---|
| JP | 2014-010439 A | 1/2014 | |
| JP | 2014-052519 A | 3/2014 | |
| JP | 2014-134672 A | 7/2014 | |
| JP | 2017-102373 A | 6/2017 | |
| WO | WO-2008120984 A1 * | 10/2008 | ........... C03C 25/106 |
| WO | WO-2019/137628 A1 | 7/2019 | |

OTHER PUBLICATIONS

International Search Report for International Application PCT/JP2021/020225 dated Aug. 10, 2021 (9 pages).

Japanese Notice of Reasons for Refusal for JP Application 2020-094881 dated Nov. 4, 2020, with English language translation (8 pages).

Japanese Notice of Reasons for Refusal for JP Application 2020-212429 dated Mar. 2, 2021 with English translation (6 pages).

Japanese Notice of Reasons for Refusal for JP Application 2021-113519 dated Aug. 3, 2021 with English translation (10 pages).

* cited by examiner

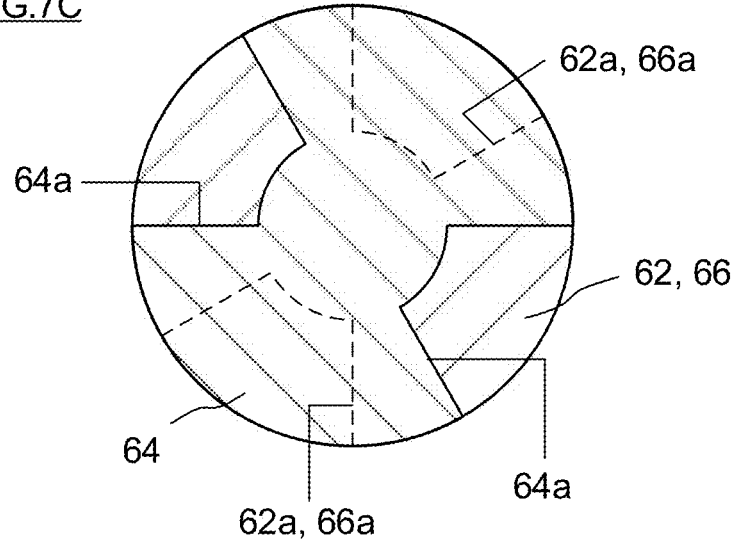
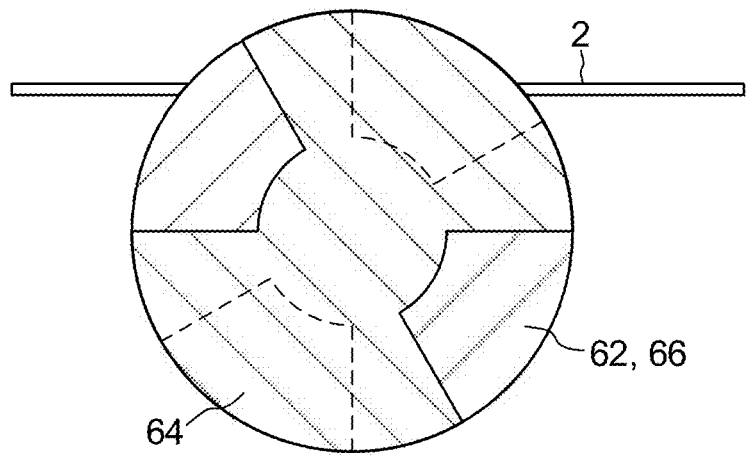

DEVICE AND METHOD FOR MANUFACTURING OPTICAL FIBER RIBBON

CROSS-REFERENCE TO RELATED APPLICATION

The present application is a continuation application of International Application No. PCT/JP2021/020225, filed May 27, 2021, which is based upon and claims the benefit of priority from Japanese Patent Application No. 2020-094881, filed May 29, 2020; the entire contents of all of which are incorporated herein by reference.

FIELD

The present invention relates to a device and a method for manufacturing an optical fiber ribbon.

BACKGROUND

There has been known an optical fiber ribbon of a partial splice type in which a plurality of single-core coated optical fibers are arranged in parallel, the adjacent single-core coated optical fibers are spliced at spaced points, and splice portions are dispersedly arranged at intervals in the length direction and the width direction.

The optical fiber ribbon of the partial splice type can be placed in a cable in a cylindrical state or a folded state because its bending anisotropy correlated with difficulty in width-direction bending is lower than that of an optical fiber ribbon of a collective coating type. This enables higher density and installability of the cable.

The optical fiber ribbon of the partial splice type is advantageous in that it is easy to make its optical fibers separately post-branch from the ribbon main body, and in addition, the optical fibers can be set in a predetermined arrangement, which facilitates their collective connection to a holder through a fusion work of a tape layer when the optical fibers are connected to the holder.

One known technique for a device or a method for manufacturing such an optical fiber ribbon of the partial splice type uses a photocurable resin when forming splice portions at spaced points.

The manufacturing device or the manufacturing method of this type, however, may fail in forming split portions themselves, may cause insufficient strength of the splice portions, and may cause variation in length among the splice portions or the split portions.

Specifically, the failure in forming the split portions themselves worsens bending anisotropy and workability in the post-branching of the optical fibers. The insufficient strength of the splice portions causes an unstable tape width (tape width variation) and causes the optical fibers to come apart, leading to difficulty in the collective connection of the optical fibers to the holder. The length variation among the splice portions or the split portions may lower the transmission characteristics of the optical fibers.

Therefore, the main object of the present invention is to provide a device and a method for manufacturing an optical fiber ribbon that make it possible to inhibit the collective connectability of optical fibers to a holder and the transmission characteristics of the optical fibers from lowering while inhibiting bending anisotropy and workability in the post-branching of the optical fibers from worsening.

SUMMARY

According to one aspect of the present invention for solving the aforesaid problems, there is provided an optical fiber ribbon manufacturing device including: a tape die for coating a plurality of single-core coated optical fibers with a photocurable resin; a split die for forming a split portion in the photocurable resin present between the single-core coated optical fibers; and a light irradiation device for irradiating the photocurable resin with light to cure the photocurable resin, wherein both the tape die and the split die are temperature-controlled or only the split die is temperature-controlled, a temperature of the tape die is higher than a temperature of the split die, and the temperature of the split die is lower than the temperature of the tape die.

According to another aspect of the present invention, there is provided an optical fiber ribbon manufacturing method including: a first step of coating a plurality of single-core coated optical fibers with a photocurable resin; a second step of forming a split portion in the photocurable resin present between the single-core coated optical fibers; and a third step of irradiating the photocurable resin with light to cure the photocurable resin, wherein, in the first step and the second step, both a tape die used in the first step and a split die used in the second step are temperature-controlled or only the split die used in the second step is temperature-controlled, a temperature of the tape die used in the first step is set higher than a temperature of the split die used in the second step, and the temperature of the split die used in the second step is set lower than the temperature of the tape die used in the first step.

According to the present invention, it is possible to inhibit the collective connectability of optical fibers to a holder and the transmission characteristics of the optical fibers from lowering while inhibiting bending anisotropy and workability in the post-branching of the optical fibers from worsening.

BRIEF DESCRIPTION OF THE DRAWINGS

FIG. 7C is a side view schematically illustrating the rotary blades of the split die according to the modification example.

FIG. 8 is a side view schematically illustrating how the rotary blades according to the modification example rotate.

DETAILED DESCRIPTION

An optical fiber ribbon according to a preferred embodiment of the present invention and a device and a method for manufacturing the same will be hereinafter described. In this specification, a numerical value range indicated by "—" includes the lower limit value and the upper limit value.

[Optical Fiber Ribbon]

Figure 1:
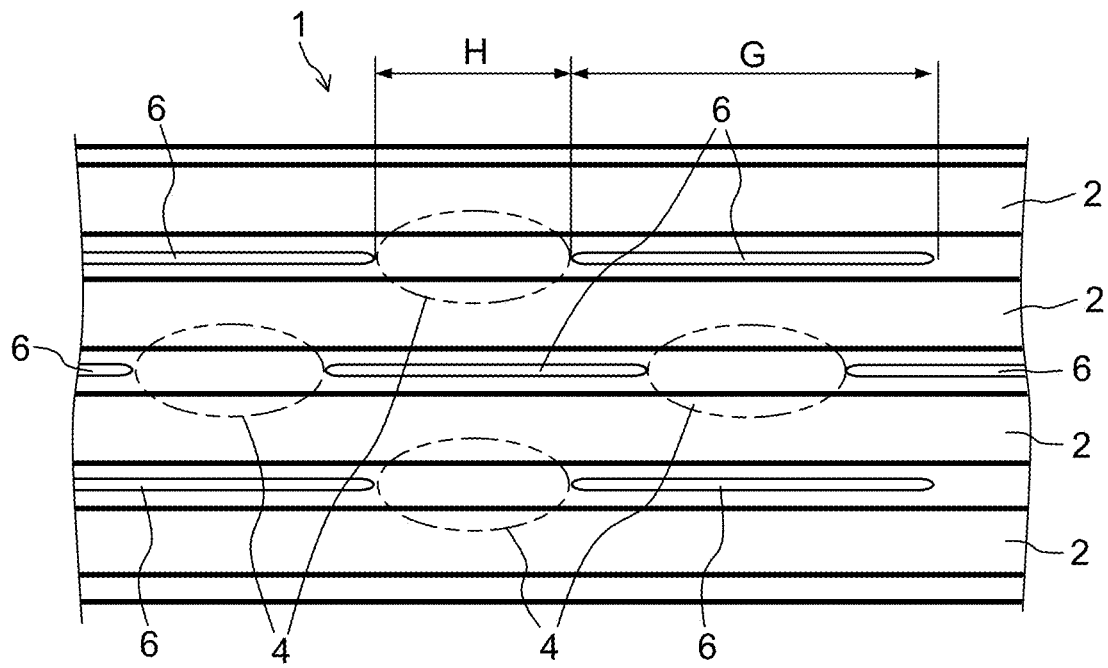
FIG. 1 is a plan view illustrating the schematic structure of an optical fiber ribbon.

FIG. 1 is a plan view illustrating the schematic structure of an optical fiber ribbon 1.

As illustrated in FIG. 1, the optical fiber ribbon 1 is an optical fiber ribbon of a partial splice type that has a plurality of (four in FIG. 1) single-core coated optical fibers 2, and in which the adjacent single-core coated optical fibers 2 are spliced or split at spaced points in their length direction and width direction, and splice portions 4 and split portions 6 are dispersedly arranged.

Figure 2:
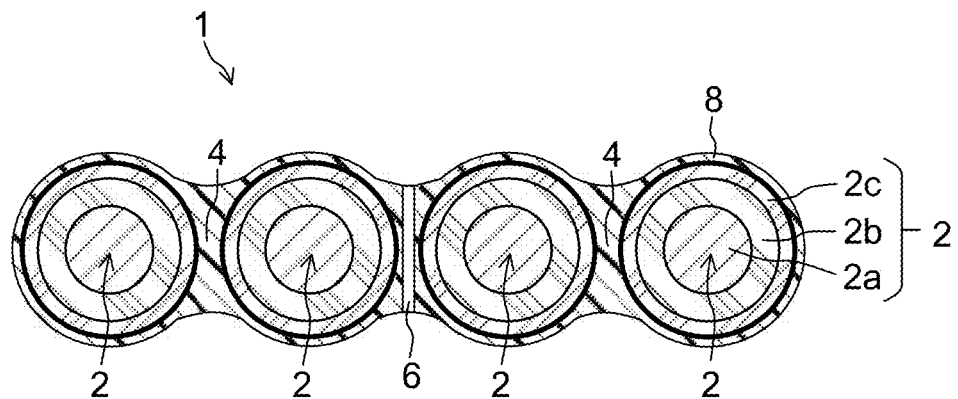
FIG. 2 is a sectional view illustrating the schematic structure of the optical fiber ribbon.

FIG. 2 is a sectional view illustrating the schematic structure of the optical fiber ribbon 1.

As illustrated in FIG. 2, in each of the single-core coated optical fibers 2, an optical fiber element wire 2a is coated with a primary coating layer 2b and a secondary coating layer 2c in sequence. In the optical fiber ribbon 1, the single-core coated optical fibers 2 are coated with a tape layer 8 (tape-shaped resin) to be integrated, and the splice portions 4 and the split portions 6 are formed in the tape layer 8.

The tape layer 8 is formed of a photocurable resin. The photocurable resin has a viscosity of 4.7-8.8 Pa·s at 25° C. and is preferably an epoxy acrylate-based photocurable resin or a urethane acrylate-based photocurable resin.

[Device and Method for Manufacturing Optical Fiber Ribbon]

(1) Optical Fiber Ribbon Manufacturing Device

Figure 3:
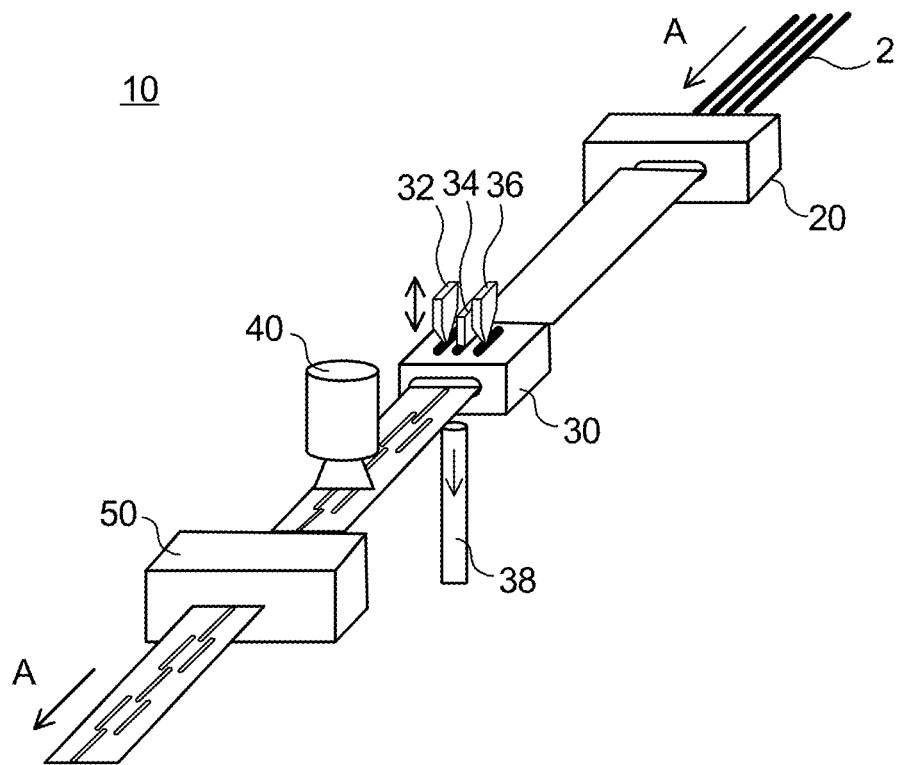
FIG. 3 is a view illustrating the schematic structure of an optical fiber ribbon manufacturing device.

FIG. 3 is a view illustrating the schematic structure of an optical fiber ribbon manufacturing device 10.

As illustrated in FIG. 3, in the optical fiber ribbon manufacturing device 10, a tape die 20, a split die 30, and two light irradiation devices 40, 50 are mainly installed in the order mentioned along the transfer direction A of the single-core coated optical fibers 2, and the single-core coated optical fibers 2 pass between these dies and devices in the order mentioned.

The tape die 20 is a general-purpose die that collectively coats the peripheries of the plurality of single-core coated optical fibers 20 with the photocurable resin, and it applies, in a tape shape, the photocurable resin that has not yet cured, on the single-core coated optical fibers 2 passing through the tape die 20 to form a precursor of the tape layer 8.

The split die 30 is provided with a plurality of (three in FIG. 3) split needles 32, 34, 36 that are movable up and down. The split needles 32, 34, 36 are each disposed above a gap between the single-core coated optical fibers 2, and the middle split needle 34 and the split needles 32, 36 on both sides alternately move up and down relative to the photocurable resin that has not cured, to form the split portions 6 and the splice portions 4 at spaced points.

The split die 30 is provided with a resin sucking device 38 for sucking a surplus portion of the photocurable resin. The resin sucking device 38 sucks the surplus photocurable resin dammed up by the moved-down split needles 32, 34, 36.

The upstream-side light irradiation device 40 irradiates the uncured photocurable resin with light so that the photocurable resin is semi-cured. "Semi-cured" means a state of the resin not completely cured, that is, a state of the resin partially cross-linked by light energy.

The downstream-side light irradiation device 50 further irradiates the semi-cured photocurable resin with light so that the photocurable resin is completely cured. "Completely cured" means a state of the resin completely or almost completely cured, that is, a state of the resin completely or almost completely cross-linked.

Regarding the upstream-side light irradiation device 40 and the downstream-side light irradiation device 50, the cumulative dose of the upstream-side light irradiation device 40 is lower than the cumulative dose of the downstream-side light irradiation device 50, and the cumulative dose of the downstream-side light irradiation device 50 is higher than the cumulative dose of the upstream-side light irradiation device 40.

In the above-described optical fiber ribbon manufacturing device 10, the temperature of the tape die 20 is higher than the temperature of the split die 30, and their temperature difference is preferably 2-25° C., more preferably 2-20° C., still more preferably 5-20° C., and yet more preferably 10-20° C.

A reason why the temperature of the tape die 20 is set higher than the temperature of the split die 30 is that high temperature improves the coatability of the photocurable resin to make it difficult for bubbles to be generated in the photocurable resin, and also lowers the viscosity of the photocurable resin to increase an effect of gathering the single-core coated optical fibers 2 owing to the surface tension of the photocurable resin or to make the resin coating sufficiently follow the single-core coated optical fibers 2 owing to its flowability even if the transfer speed (linear velocity) becomes high, making it possible to inhibit the generation of voids (holes) in the resin coating.

Figure 4:
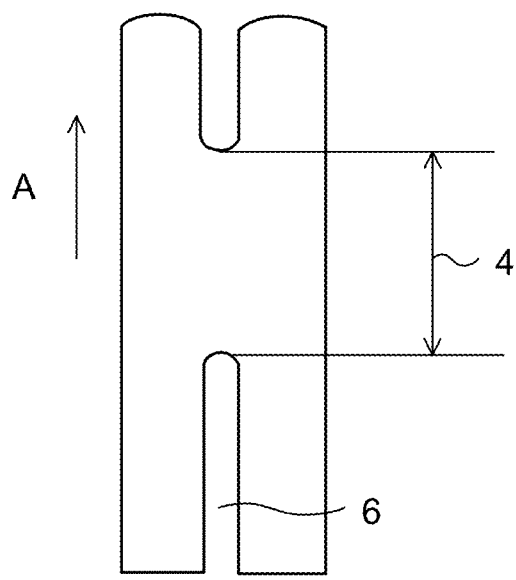
FIG. 4 is a plan view illustrating an example of a proper split portion and a proper splice portion.
Figure 5:
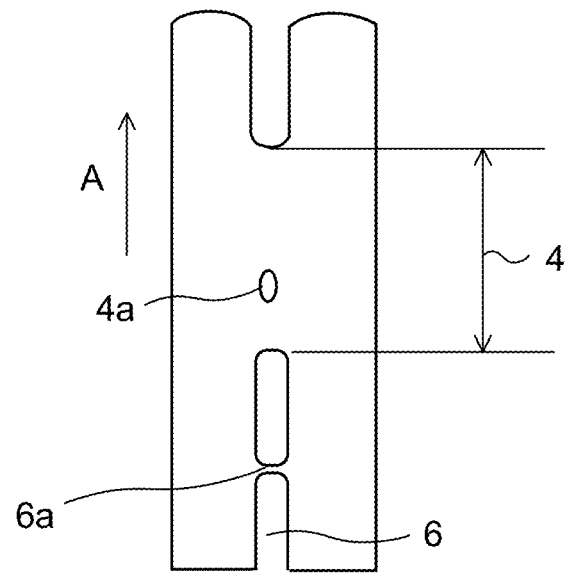
FIG. 5 is a plan view illustrating an example of an improper split portion and an improper splice portion.

A reason why the temperature of the split die 30 is contrarily set lower than the temperature of the tape die 20 is that low temperature increases the viscosity of the photocurable resin to maintain its interface (reduce the flow of the photocurable resin to the split portions 6) when the split needles 32, 34, 36 move down to form the split portions 6. Another reason is that, if the photocurable resin is kept at a high temperature to become lower in viscosity, the resin sucking device 38 excessively sucks the photocurable resin, which may cause the splice portions 4 to be deficient in the photocurable resin. That is, if the property and viscosity of the photocurable resin are properly adjusted, the formed split portions 6 and splice portions 4 conform to design values (see FIG. 4), but if the property and viscosity of the photocurable resin are not properly adjusted, the photocurable resin flows at the middle of the split portion 6 to form a bridge portion 6a, or a deficient portion 4a (unexpected split portion) is formed in the splice portion 4 (see FIG. 5).

The intentional temperature control may be performed on both the tape die 20 and the split die 30 or may be performed on one of the dies according to the installation environment of the dies, the temperature of the supplied resin itself, or the like.

Specifically, the intentional temperature control may be performed in any of the following manners: (1) the tape die 20 and the split die 30 are each provided with a heater wire and a thermocouple, and the heater wires are controlled based on the measurement results of the thermocouples; (2) only the tape die 20 is provided with a thermocouple and a heater wire, and the temperature of only the tape die 20 is controlled while the split die 30 is left at the installation environment temperature; and (3) the tape die 20 is left as it is after being supplied with the uncured photocurable resin that has been melted by heating, and the split die 30 is provided with a thermocouple and a heater wire and the temperature of only the split die 30 is controlled.

(2) Optical Fiber Ribbon Manufacturing Method

While the single-core coated optical fibers 2 are transferred along the transfer direction A (the transfer speed is preferably 60-300 m/minute), the tape die 20 first coats the single-core coated optical fibers 2 with the uncured photocurable resin in a tape shape to form the precursor of the tape layer 8.

Thereafter, the split needles 32, 34, 36 of the split die 30 are moved up and down relative to the precursor of the tape layer 8 to form the split portions 6 and the splice portions 4 in the precursor of the tape layer 8.

Thereafter, the light irradiation device 40 irradiates the precursor of the tape layer 8 with light to semi-cure the uncured photocurable resin, and finally the light irradiation device 50 further irradiates the semi-cured photocurable resin with light to completely cure it.

While these steps are ongoing, the temperature of the tape die 20 is set higher than the temperature of the split die 30, and the light irradiation is set in two stages, with the cumulative dose of the light irradiation device 40 being set lower than the cumulative dose of the light irradiation device 50.

The following is a reason why the light irradiation is set in two stages.

The split needles 32, 34, 36 of the split die 30 each have a certain thickness, and in the precursor of the tape layer 8 after it passes through the split die 30, the uncured photocurable resin is liquid, and because of the influence of its surface tension and so on, the distance between the single-core coated optical fibers 2 begins to reduce.

As a countermeasure against this, the first-stage light irradiation partially cross-links the uncured photocurable resin through the light irradiation by the upstream-side light irradiation device 40. This makes it possible to turn at least the resin surface from the liquid state into a half-solid state. As a result, it is possible to control the distance reduction between the single-core coated optical fibers 2 so that the split portions 6 have a width close to the design value.

On the other hand, if the second-stage light irradiation is executed without executing the first-stage light irradiation, the uncured photocurable resin completely cures in the precursor of the tape layer 8 after it passes through the split die 30, so that the width of the split portions 6 is substantially decided by the thickness of the split needles 32, 34, 36 and is difficult to approach the design value.

According to the above-described optical fiber ribbon manufacturing device 10 and manufacturing method, setting the temperature of the tape die 20 higher than the temperature of the split die 30 prevents a failure in forming the split portions 6 themselves, insufficient strength of the splice portions 40, variation in length among the splice portions 4 or the split portions 6. This makes it possible to inhibit the collective connectability of the optical fibers to the holder and the transmission characteristics of the optical fibers from lowering while inhibiting bending anisotropy and workability in the post-branching of the optical fibers from worsening (see Examples below).

Modification Examples

Figure 6:
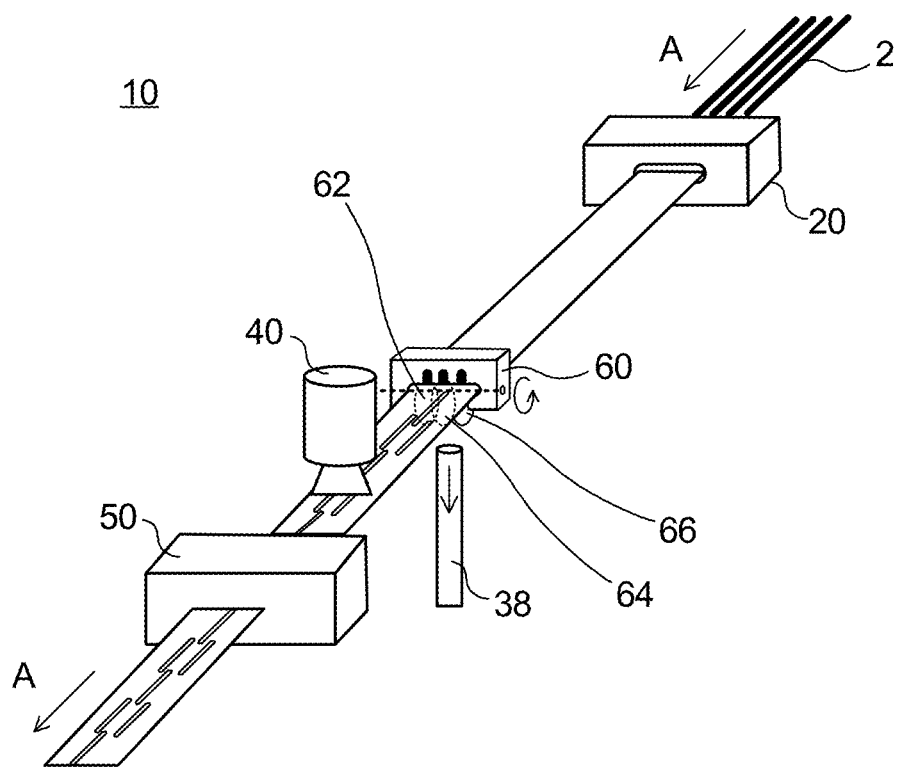
FIG. 6 is a view illustrating the schematic structure of an optical fiber ribbon manufacturing device according to a modification example.

A split die 60 in FIG. 6 may be employed in place of the split die 30 in FIG. 3.

In the split die 60 in FIG. 6, a plurality of (three in FIG. 6) rotary blades 62, 64, 66 are installed on a surface from which the single-core coated optical fibers 2 exit. The rotary blades 62, 64, 66 rotate as the single-core coated optical fibers 2 are transferred, and their rotations are coaxial.

Figure 7A:
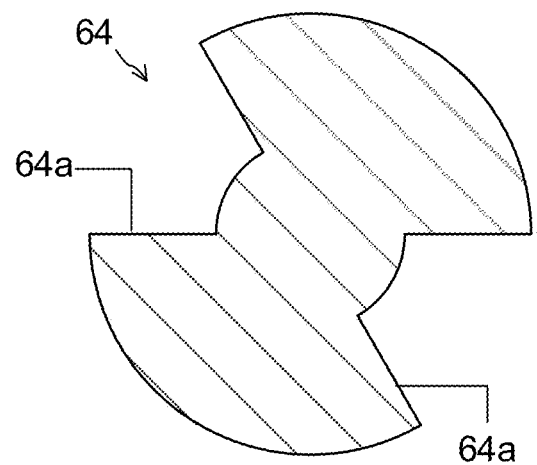
FIG. 7A is a side view illustrating the schematic structure of a rotary blade of a split die according to the modification example.
Figure 7B:
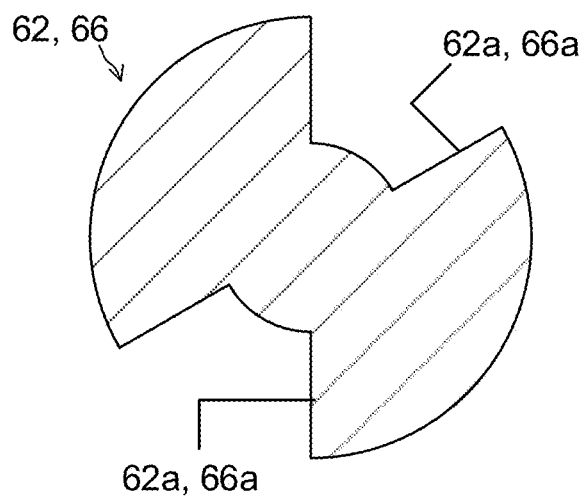
FIG. 7B is a side view illustrating the schematic structure of rotary blades of the split die according to the modification example.

As illustrated in FIG. 7A, cutouts 64a are formed in the middle rotary blade 64, and as illustrated in FIG. 7B, cutouts 62a, 66a are also formed in the rotary blades 62, 66 on both sides. As illustrated in FIG. 7C, the cutouts 64a of the middle rotary blade 64 are phase-shifted from the cutouts 62a, 66a of the rotary blades 62, 66 on both sides.

As illustrated in FIG. 8, in the rotation of the rotary blades 62, 64, 66 following the transfer of the single-core coated optical fibers 2, the rotary blades 62, 64, 66 rotate while the cutouts 64a of the middle rotary blade 64 and the cutouts 62a, 66a of the rotary blades 62, 66 on both sides are left phase-shifted, thereby forming the split portions 6 and the splice portions 4 alternately.

Figure 9:
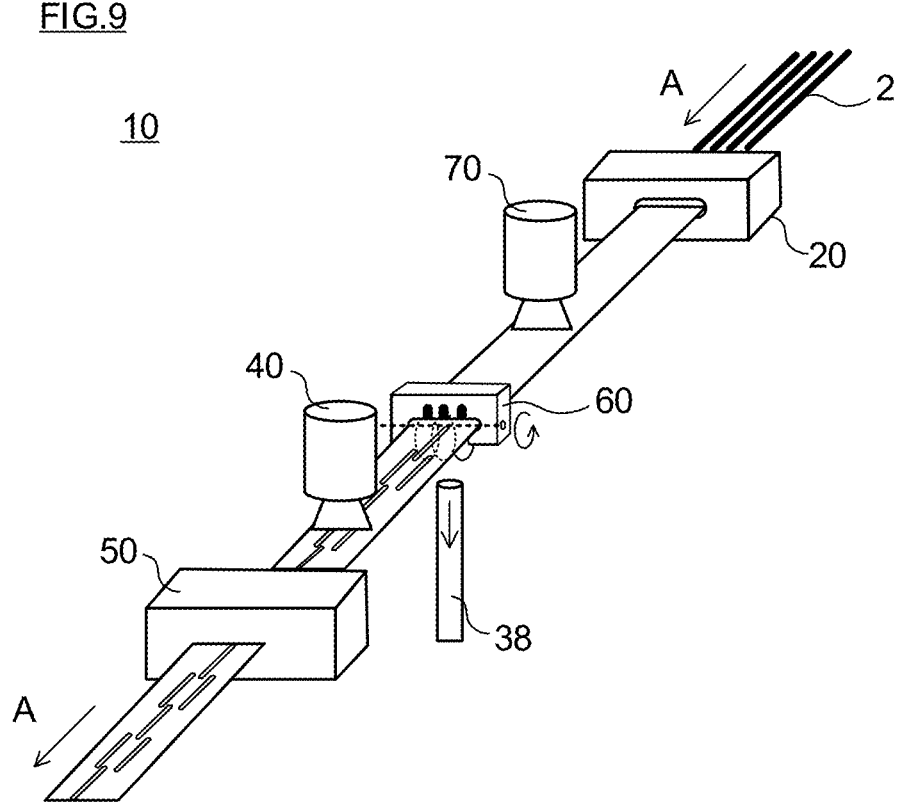
FIG. 9 is a view illustrating the schematic structure of an optical fiber ribbon manufacturing device according to a modification example.

As illustrated in FIG. 9, in both of the manufacturing devices 10 in FIG. 3 and FIG. 6, a light irradiation device 70 may be installed above an area between the tape die 20 and the split die 30, 60.

In such a case, the cumulative dose of the light irradiation device 70 is set lower than that of the upstream-side light irradiation device 40.

The light irradiation device 70 is capable of increasing the effect of gathering the single-core coated optical fibers 2 and also improving the formability of the splice portions 4 and the split portions 6.

Examples (1) Fabrication of Samples (1.1) Samples 1-7

Using the optical fiber ribbon manufacturing device in FIG. 6, four-fiber optical fiber ribbons of a partial splice type were manufactured. Their splice portions had a 20 mm length (reference sign H in FIG. 1) and their split portions had a 50 mm distance (reference sign G in FIG. 1).

As the single-core coated optical fibers, single-core coated optical fibers with a 250 μm outside diameter in each of which a primary coating formed of a urethane acrylate-based photocurable resin having an about 5 MPa Young's modulus at 23° C. and a secondary coating formed of a urethane acrylate-based photocurable resin having an about 700 MPa Young's modulus at 23° C. were applied on a quartz glass-based SM optical fiber with a 125 μm outside diameter were used.

As the photocurable resin for forming the tape layer, an epoxy acrylate-based photocurable resin was used, a tape die having a hole diameter of 1.26×0.38 mm (ellipse) was used as the tape die, and the photocurable resin that had not cured yet was applied in a tape shape on the four single-core coated optical fibers.

The other manufacturing conditions were as follows:
transfer speed (linear velocity): 200 m/min
distance between the tape die (outlet) and the split die (inlet): 40 mm
interval between the single-core coated optical fibers at their portions passing through the rotary blades of the split die: 320 μm
cumulative dose of the upstream-side light irradiation device: 15.6 mJ/cm$^2$
cumulative dose of the downstream-side light irradiation device: 149 mJ/cm$^2$ (1.2) Samples 11-13

Some of the manufacturing conditions of the samples 1-7 (transfer speed, temperature difference between dies, or others) were changed. In the samples 11-12, the transfer speed was set to 60 m/min and in the sample 13, the transfer speed was set to 300 m/min. Optical fiber ribbons of a partial splice type were manufactured in the same manner as the samples 1-7 except for the above conditions.

(1.3) Samples 21-27

A urethane acrylate-based photocurable resin was used for forming a tape layer in place of that in the samples 1-7. Except for this, optical fiber ribbons of a partial splice type were manufactured in the same manner as the samples 1-7.

(2) Evaluation of Samples (2.1) Calculation of Split Error Incidence

States of three split portions within one pitch (1 pitch=70 mm) along the longitudinal direction are observed, and a failure in forming the split portion at least in one place or the presence of a bridge portion is counted as a split error.

Twenty samples of each of the samples 1-7, 11-13, 21-27 were observed (50 pitches per sample), and a split error incidence was found from the number of the split errors/the total number (1000) of the split portions.

In Table 1-Table 3, "A" indicates that the split error incidence is 0.1% or less, "B" indicates that the split error incidence is over 0.1% and less than 0.5%, and "C" indicates that the split error incidence is 0.5% or more.

(2.2) Measurement of Tape Strength

An impact test specified as IEC60794-1-2 Impact was conducted.

In this impact test, the samples were each mounted in a cable, and the impact drop test was conducted on the cables. Specifically, the impact drop test of the cables is conducted in which the mass of an object to be dropped is set to 1 kg and drop height is set to 1 m, the cable is disassembled, the sample is taken out, and the number of places where the splice portion is broken is measured.

In Table 1-Table 3, "A" indicates that the number of the broken places is 0, "B" indicates that the number of the broken places is 1-3, and "C" indicates that the number of the broken places is 4 or more.

(2.3) Evaluation of Tape Width

A difference by which the width of each sample was larger than the design width of 1.10 mm was measured, and the collective connectability of the optical fibers to a holder through a fusion work of the tape layer (whether the single-core coated optical fibers could be collectively inserted as a set to the holder by fusing the tape layer) was evaluated.

In Table 1-Table 3, "A" indicates that the width difference of the sample from the design value is −0.05 or more and within +0.04 mm, and "C" indicates that the width difference is over +0.04 mm.

(2.4) Measurement of Transmission Loss

A transmission loss ($\lambda$=1.55 μm) was measured using OTDR AQ7280-HJ manufactured by YOKOGAWA.

In Table 1-Table 3, "A" indicates that the transmission loss is 0.30 dB/km or less, "B" indicates that the transmission loss is over 0.30 dB/km and within 0.35 dB/km, and "C" indicates that the transmission loss is over 0.35 dB/km.

TABLE 1

| Sample | | 1 | 2 | 3 | 4 | 5 | 6 | 7 |
|---|---|---|---|---|---|---|---|---|
| Resin of tape layer | Type | Epoxy acrylate-based | | | | | | |
| | Viscosity before curing (25° C.) | 5.2 ± 0.5 Pa · s | | | | | | |
| | Viscosity after curing (50° C.) | 0.6 Pa · s | | | | | | |
| | Young's modulus after curing | 550 MPa | | | | | | |
| | Temperature of tape die (° C.) | 50 | 50 | 50 | 50 | 40 | 30 | 25 |
| | Temperature of split die (° C.) | 50 | 40 | 30 | 25 | 40 | 30 | 25 |
| | Temperature difference between dies (° C.) | 0 | 10 | 20 | 25 | 0 | 0 | 0 |
| | Split error incidence | C | A | A | A | A | A | A |
| | Tape strength | C | A | A | A | A | A | A |
| | Tape width | A | A | A | A | C | C | C |
| | Transmission loss | A | A | A | B | A | A | A |

TABLE 2

| Sample | | 11 | 12 | 13 |
|---|---|---|---|---|
| Resin of tape layer | Type | Epoxy acrylate-based | | |
| | Viscosity before curing (25° C.) | 5.2 ± 0.5 Pa · s | | |
| | Viscosity after curing (50° C.) | 0.6 Pa · s | | |
| | Young's modulus after curing | 550 MPa | | |
| | Temperature of tape die (° C.) | 30 | 45 | 45 |
| | Temperature of split die (° C.) | 28 | 35 | 35 |
| | Temperature difference between dies (° C.) | 2 | 10 | 10 |
| | Split error incidence | A | A | A |
| | Tape strength | A | A | A |
| | Tape width | A | A | A |
| | Transmission loss | A | A | A |

TABLE 3

| Sample | | 21 | 22 | 23 | 24 | 25 | 26 | 27 |
|---|---|---|---|---|---|---|---|---|
| Resin of tape layer | Type | Urethane acrylate-based | | | | | | |
| | Viscosity before curing (25° C.) | 7.8 ± 1.0 Pa · s | | | | | | |
| | Viscosity after curing (50° C.) | 0.8 Pa · s | | | | | | |
| | Yonng's modulus after curing | 1090 MPa | | | | | | |
| | Temperature of tape die (° C.) | 50 | 50 | 50 | 50 | 40 | 30 | 25 |
| | Temperature of split die (° C.) | 50 | 45 | 40 | 30 | 40 | 30 | 25 |
| | Temperature difference between dies (° C.) | 0 | 5 | 10 | 20 | 0 | 0 | 0 |
| | Split error incidence | C | A | A | A | A | A | A |
| | Tape strength | C | A | A | A | A | A | A |

TABLE 3-continued

| Sample | 21 | 22 | 23 | 24 | 25 | 26 | 27 |
|---|---|---|---|---|---|---|---|
| Tape width | A | A | A | A | C | C | C |
| Transmission loss | A | A | A | A | A | A | A |

(3) Summary

As shown in Table 1-Table 3, in the samples 2-4, 11-13, 22-24, all of the results of the split error incidence, the tape strength, the tape width, and the transmission loss were good (A) or reached a practically usable level (B).

It is seen from the above that setting the temperatures of the tape die and the split die differently, with the temperature of the tape die being set higher than the temperature of the split die, is effective to inhibit the collective connectability of the optical fibers to the holder and the transmission characteristics of the optical fibers from lowering while inhibiting bending anisotropy and workability in the post-branching of the optical fibers from worsening.

In particular, the results of the samples 2-3, 11-13, 22-24 show that in the case where the tape layer is formed of the epoxy acrylate-based photocurable resin or the urethane acrylate-based photocurable resin, setting the temperature difference between the tape die and the split die to 2-25° C., preferably 2-20° C. is effective.

The present invention relates to a device and a method for manufacturing an optical fiber ribbon and is effective for inhibiting the collective connectability of optical fibers to a holder and the transmission characteristics of the optical fibers from lowering while inhibiting bending anisotropy and workability in the post-branching of the optical fibers from worsening.

REFERENCE SIGNS LIST

A transfer direction (of single-core coated optical fibers)
1 optical fiber ribbon
2 single-core coated optical fiber
2*a* optical fiber element wire
2*b* primary coating layer
2*c* secondary coating layer
4 splice portion
4*a* deficient portion
6 split portion
6*a* bridge portion
8 tape layer
10 optical fiber ribbon manufacturing device
20 tape die
30 split die
32, 34, 36 split needle
38 resin sucking device
40 (upstream-side) light irradiation device
50 (downstream-side) light irradiation device
60 split die
62, 64, 66 rotary blade
62*a*, 64*a*, 66*a* cutout
70 light irradiation device

What is claimed is:

1. An optical fiber ribbon manufacturing method comprising:
 a first step of coating a plurality of single-core coated optical fibers with a photocurable resin;
 a second step of forming a split portion in the photocurable resin present between all of the single-core coated optical fibers; and
 a third step of irradiating the photocurable resin with light to cure the photocurable resin,
 wherein, in the first step and the second step, both a tape die used in the first step and a split die used in the second step are temperature-controlled a temperature of the tape die used in the first step is set higher than a temperature of the split die used in the second step, and the temperature of the split die used in the second step is set lower than the temperature of the tape die used in the first step,
 wherein the photocurable resin has a 4.7-8.8 Pa·s viscosity at 25° C., and
 wherein a temperature difference between the tape die and the split die is set to 2-25° C.

2. The optical fiber ribbon manufacturing method according to claim 1,
 wherein the temperature of the tape die used in the first step is set to 30-50° C., and
 wherein the temperature of the split die used in the second step is set to 25-45° C.

3. The optical fiber ribbon manufacturing method according to claim 1,
 wherein the photocurable resin is an epoxy acrylate-based photocurable resin or a urethane acrylate-based photocurable resin.

* * * * *